US012339764B2

(12) United States Patent
Hermanns et al.

(10) Patent No.: US 12,339,764 B2
(45) Date of Patent: Jun. 24, 2025

(54) MACHINE-LEARNING BASED SOFTWARE TESTING TECHNIQUE

(71) Applicant: Telefonaktiebolaget LM Ericsson (PUBL), Stockholm (SE)

(72) Inventors: Nikolas Hermanns, Heinsberg (DE); Magued Sedra, Aachen (DE); Sujata Roy Chowdhury, Aachen (DE); Sarah Beschorner, Aachen (DE); Alexandros Palaios, Moers (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 171 days.

(21) Appl. No.: 18/007,246

(22) PCT Filed: Jul. 31, 2020

(86) PCT No.: PCT/EP2020/071705
§ 371 (c)(1),
(2) Date: Jan. 27, 2023

(87) PCT Pub. No.: WO2022/022838
PCT Pub. Date: Feb. 3, 2022

(65) Prior Publication Data
US 2023/0267073 A1 Aug. 24, 2023

(51) Int. Cl.
*G06F 9/44* (2018.01)
*G06F 11/3668* (2025.01)

(52) U.S. Cl.
CPC .................. *G06F 11/3688* (2013.01)

(58) Field of Classification Search
None
See application file for complete search history.

(56) References Cited

U.S. PATENT DOCUMENTS

| | | | | |
|---|---|---|---|---|
| 10,241,897 | B2* | 3/2019 | Sinha | G06F 11/3672 |
| 10,430,319 | B1* | 10/2019 | Tokappa | G06F 11/3692 |
| 11,169,906 | B2* | 11/2021 | Krishna | G06F 11/3664 |
| 11,474,932 | B2* | 10/2022 | Ramraz | G06F 11/3684 |
| 2017/0132119 | A1 | 5/2017 | Xu et al. | |
| 2019/0087311 | A1* | 3/2019 | Donaldson | G06F 11/3688 |
| 2019/0104047 | A1* | 4/2019 | Tejaprakash | H04L 43/50 |

OTHER PUBLICATIONS

Charles Anderson et al., "On the Use of Neural Networks to Guide Software Testing Activities", International Test Conference, Paper 31.3—IEEE 1995.
PCT Written Opinion of the International Searching Authority issued for International application No. PCT/EP2020/071705—Apr. 28, 2021.
PCT International Search Report issued for International application No. PCT/EP2020/071705—Apr. 28, 2021.

* cited by examiner

*Primary Examiner* — Qamrun Nahar
(74) *Attorney, Agent, or Firm* — Weisberg I.P. Law, P.A.

(57) ABSTRACT

A technique of training a model for determining a test case for software testing is presented, wherein the software testing is based on a set of test cases built for a set of software modules comprised by a software to be tested. The technique uses artificial intelligence and comprises obtaining log information resulting from execution of each of the test cases, wherein the log information is obtained per software module and per executed test case, and performing supervised machine learning based on the log information obtained per software module and per executed test case as input to train a model for predicting the executed test case.

17 Claims, 8 Drawing Sheets

Fig. 1

Test Case T1: Content of raw Neutron log file:

<134>2020-07-01T12:36:15.607285+02:00 cic-1.domain.tld heat-engine[30136]: 2020-07-01 12:36:15.604 30136 INFO heat.engine.service [req-1608692d-7b33-49a8-ae14-4a1bfd2eed97 - admin - default default] Creating stack ccd_oam_director_301

<134>2020-07-01T12:36:15.640319+02:00 cic-1.domain.tld heat-engine[30136]: 2020-07-01 12:36:15.637 30136 INFO heat.engine.resource [req-1608692d-7b33-49a8-ae14-4a1bfd2eed97 - admin - default default] Validating Net "ms_net"

<134>2020-07-01T12:36:15.646287+02:00 cic-1.domain.tld heat-engine[30136]: 2020-07-01 12:36:15.644 30136 INFO heat.engine.resource [req-1608692d-7b33-49a8-ae14-4a1bfd2eed97 - admin - default default] Validating Subnet "ms_subnet"

<134>2020-07-01T12:45:21.857082+02:00 cic-1.domain.tld heat-engine[30142]: 2020-07-01 12:45:21.854 30142 INFO heat.engine.service [req-2a7dfed3-fc48-4305-a32a-1f6f025b8f6d - admin - default default] Creating stack ccd_cluster1

<134>2020-07-01T12:45:21.888033+02:00 cic-1.domain.tld heat-engine[30142]: 2020-07-01 12:45:21.886 30142 INFO heat.engine.resource [req-2a7dfed3-fc48-4305-a32a-1f6f025b8f6d - admin - default default] Validating Net "ms_net"

<166>2020-07-05T01:00:52.770757+02:00 cic-1.domain.tld neutron-server[29693]: 2020-07-05 01:00:52.769 29693 INFO networking_odl.db.db [req-d0a2297a-7e2c-4f6c-a7d4-e6cbe4be1836 - - - -] Starting hostconfig periodic task.

<166>2020-07-05T01:00:52.771325+02:00 cic-1.domain.tld neutron-server[29693]: 2020-07-05 01:00:52.770 29693 INFO networking_odl.ml2.pseudo_agentdb_binding [req-d0a2297a-7e2c-4f6c-a7d4-e6cbe4be1836 - - - -] Row is absent task hostconfig, returning True <166>2020-07-05T01:00:56.091737+02:00 cic-1.domain.tld neutron-server[29657]: 2020-07-05 01:00:56.091 29657 INFO neutron.wsgi [-] 127.0.0.1 "GET / HTTP/1.1" status: 200 len: 227 time: 0.0010569

<166>2020-07-05T01:00:59.657791+02:00 cic-1.domain.tld neutron-server[29658]: 2020-07-05 01:00:59.656 29658 INFO neutron.wsgi [req-73d2b735-81bf-4771-99eb-0030a1600aee 23949c06e17944b8a0b885725861f021 750df9e922044c5fb034762b730bcd9a - default default] 192.168.2.34,127.0.0.1 "OPTIONS / HTTP/1.1" status: 200 len: 278 time: 0.0010250

<166>2020-07-05T01:01:00.448533+02:00 cic-1.domain.tld neutron-server[29649]: 2020-07-05 01:01:00.447 29649 INFO neutron.wsgi [req-03ac81db-7733-4c47-95ce-3b1ff8bc3f31 23949c06e17944b8a0b885725861f021 750df9e922044c5fb034762b730bcd9a - default default] 192.168.2.35,127.0.0.1 "OPTIONS / HTTP/1.1" status: 200 len: 278 time: 0.0010080

<166>2020-07-05T01:01:02.668379+02:00 cic-1.domain.tld neutron-server[29658]: 2020-07-05 01:01:02.667 29658 INFO neutron.wsgi [req-73d2b735-81bf-4771-99eb-0030a1600aee 23949c06e17944b8a0b885725861f021 750df9e922044c5fb034762b730bcd9a - default default] 192.168.2.254,127.0.0.1 "OPTIONS / HTTP/1.1" status: 200 len: 278 time: 0.0011020

<166>2020-07-05T01:01:05.313261+02:00 cic-1.domain.tld neutron-server[29656]: 2020-07-05 01:01:05.312 29656 INFO neutron.wsgi [req-4edc9e3-5350-4f00-b88c-3739cde926a8 e34c5b0f9436485ea0e8c333d8aaa6c7 a49e12c8c8124cefb0b1b91ee7778d24 - default default] 192.168.2.254,127.0.0.1 "GET /v2.0/ports?tenant_id=750df9e922044c5fb034762b730bcd9a&device_id=88b25186-365d-4f47-a665-473989b43483 HTTP/1.1" status: 200 len: 2652 time: 0.0554171

| | T1 | T2 | T3 |
|---|---|---|---|
| M1 | 1 | 0,1 | 0,5 |
| M2 | 0 | 0,5 | 1 |
| M3 | 0 | 1 | 0,3 |
| M4 | 0 | 0 | 1 |

| | T1 | T2 | T3 |
|---|---|---|---|
| | 1 | 0 | 0 |
| | 0 | 1 | 0 |
| | 0 | 0 | 1 |

Fig. 6

Event Templates:

Event 1: PacketResponder * for block * terminating

Event 2: Received block * of size * from *

Event 3: *:Got exception while serving * to *

Event 4: Verification succeeded for *

Event 5: Deleting block * file *

Log Events:

Log 1 → Event 1      Log 2 → Event 2
Log 3 → Event 1      Log 4 → Event 2
Log 5 → Event 3      Log 6 → Event 4
Log 7 → Event 5      Log 8 → Event 5

| T1 | 0,34 |
|----|------|
| T2 | 0 |
| T3 | 0,87 |
| T4 | 0,11 |
| T5 | 0,92 |
| ... | ... |
| TM | 0 |

| M1 | 1 |
|----|---|
| M2 | 1 |
| M3 | 0 |
| M4 | 0 |
| M5 | 1 |
| ... | ... |
| MN | 1 |

MACHINE-LEARNING BASED SOFTWARE TESTING TECHNIQUE

PRIORITY

This nonprovisional application is a U.S. National Stage Filing under 35 U.S.C. § 371 of International Patent Application Serial No. PCT/EP2020/071705 filed Jul. 31, 2020 and entitled "MACHINE-LEARNING BASED SOFTWARE TESTING TECHNIQUE" which is hereby incorporated by reference in their entirety.

TECHNICAL FIELD

The present disclosure generally relates to software testing using artificial intelligence (AI). In more detail, a machine learning-based technique for software testing is described. The technique can be implemented in the form of methods, a computer program product, apparatuses and a system.

BACKGROUND

Software testing has become an increasingly challenging task since software changes are more frequent and software release cycles shorter than one or two decades ago. As a result of these developments, also the time available for software testing has decreased, and manual software testing has increasingly been replaced by automated software testing. Automated software testing in some variants involves automatically executing a suite of test cases before a new software release is installed in an operative environment to find out if the new software release behaves as expected.

To reduce the amount of test data produced by software testing, one or a few particularly promising test cases may be pre-selected by a human operator. The human operator will thus initially analyze the additional or modified functionalities of a new software release and then use his or her experience to select one or a few test cases that particularly address those functionalities.

Evidently, human test case selection is cumbersome and error-prone, and strongly depends to the expertise and skills of the human operator. For example, the new software release may be composed of several software modules, and some of those software modules may inadvertently not be tested by the selected test case, while others go through a redundant number of tests despite not having changed compared to the preceding release.

As a result of the above, the advantages offered by automated software testing are not fully exploited today. It would thus be desirable to reduce the time and costs associated with automated software testing while at the same time increasing the software quality.

SUMMARY

There is a need for increasing efficiency and quality of automated software testing.

According to a first aspect, a method of training a model for determining a test case for software testing is presented, wherein the software testing is based on a set of test cases built for a set of software modules comprised by a software to be tested. The method comprises obtaining log information resulting from execution of each of the test cases, wherein the log information is obtained per software module and per executed test case, and performing supervised machine learning based on the log information obtained per software module and per executed test case as input to train a model for predicting the executed test case.

An output of the model may be represented in various forms, for example in vector form as an output vector. The output vector may have a dimension corresponding to a number of test cases comprised by the set of test cases. The output vector may have vector components derived indicative of the executed test case. In implementation, the output vector is representable as a one hot vector indicative of the executed test case.

The input to the model to be trained may be represented in various forms, for example in vector form as training vectors. As such, the input may be representable as a set of training vectors, each training vector being associated with a particular executed test case and having a dimension corresponding to a number of software modules comprised by the set of software modules. Each training vector may have vector components derived from the log information.

The method may comprise processing the log information prior to deriving the vector components. The log information may comprise one or more logged events (e.g., represented as individual log lines in a log file). Processing the log information obtained for a particular software module may comprise pruning a portion of the log information pertaining to one or more logged events repeatedly occurring upon execution of the particular software model across the test cases. As an example, log events that are expectedly logged in a regular manner may be pruned. As such, only unexpected log events potentially indicative of an erroneous behaviour (e.g., a failure) of a particular software module may remain in the log information after pruning.

In some implementations, the vector components for a given software module in different training vectors are weighted relative to each other across the executed test cases. The weighting may, for example, reflect an amount of log information created by the given software module upon execution of a particular test case relative to an amount of log information created by the given software module upon execution of another test case.

The log information may be contained as logged events in a log file created per test case execution and per software module. An individual logged event may correspond to an individual log line in a log file. In such a case, the amount of log information is derived from a number of logged events contained in a particular log file. In some cases, the amount of log information is defined by the number of logged events contained in a particular log file after logged events repeatedly occurring upon execution of the particular software model across the test cases have been pruned.

Deriving a vector component for given executed test case and a given software module may comprise normalization operation across the executed test cases, such as normalizing an amount of log information created for the given test case and the given software module relative to a maximum amount of log information created for the given software module upon execution of any of the test cases. As such, a given software module may be weighted higher for a test case that resulted in larger amount of log information compared to a test case that resulted in lower amount of log information.

The model may comprise a neural network although similar techniques might be used. Non-limiting examples include regression techniques, linear estimators, logistic regression, statistical estimates and information theory techniques.

The method may also comprise using the trained model for determining at least one test case for software testing.

The set of software modules may be provided in the form of dedicated releases (e.g., in dedicated stacks, suites or packages). In this regard, the software to be tested may comprise a new release of the set of software modules in which at least one of the software modules was modified compared to an earlier release of the software modules.

The method may comprise determining, per software module, if the software module in the new release was modified relative to the earlier release. The method may further comprise generating an input vector for the trained model. The input vector may have a dimension corresponding to a number of software modules comprised by the set of software modules. Moreover, the input vector may have vector components quantifying a modification of the respective software module. The vector components may be numerical values, such as one of integers, floating point numbers and binary values for quantifying the modifications in different levels or detail. As an example for a binary quantification, a vector component may be set to 1 if the associated software module was modified or to 0 if there was no modification. Alternatively, integers or floating pint numbers may be used to quantify the modification on a more granular basis (e.g., to reflect the number of code lines that have been modified per module, optionally normalized relative to the code module that experienced the most modifications).

Determining the at least one test case for the new release of software modules may comprise inputting the input vector to the trained model. In this context, the trained model may output a correlation result for each test case, and the test case for the new software release may be determined based on the correlation results. If the correlation results are numerical values, and the test case for the new software release is determined based on one of thresholding and selecting an extrema.

The set of the test cases may have been executed before a modification of at least one software module comprised therein and after the modification, wherein there is a log information change between the executions. For example, the set of test cases may have been executed for two or more earlier releases of the set of software modules, which increases the total amount of training data for the model to be trained.

The test cases may be configured to call the software modules via an application programming interface (API). Like the software modules, the test cases may be individual software routines that, upon execution, each call a (typically true) subset of the set of software cases. Different test cases may call different (but not necessarily disjoint) subsets of software modules.

According to a second aspect, a method of determining at least one test case for software testing out of a set of test cases built for a set of software modules comprised by a software to be tested is presented. The method of the second aspect comprises obtaining a trained model configured to predict at least one test case to be executed (e.g., the model derived in accordance with first method aspect). The method of the second aspect further comprises obtaining a software to be tested that comprises a new release of the set of software modules, wherein in the new release of the software modules at least one of the software modules was modified compared to an earlier release of the software modules. The method also comprises determining, per software module, if the software module in the new release was modified relative to the earlier release, and generating a data structure representable as an input vector having a dimension corresponding to a number of software modules comprised by the set of software modules, with the input vector having vector components quantifying a modification of the respective software module. Further still, the method comprises determining at least one test case for the new release of software modules based on an output of the trained model using the data structure as an input.

As explained above, the trained model may have been trained based on log information that resulted (e.g., per software module) from execution of each of the test cases for the earlier release of the software modules. one or more training vectors for the untrained model may haven been generated from the log information.

As also explained above, the vector components of the input vector may be one of integers, floating point numbers and binary values. The trained model may comprise a neural network. The output may comprise a correlation result for each test case, wherein the at least one test case for testing the new software release is determined based on the correlation results. When the correlation results are numerical values, the at least one test case for the new software release can be determined based on one of thresholding and selecting an extrema.

The method according to the second aspect may comprise executing the at least one determined test case and identifying that the at least one executed test case has detected at least one failure. In this case, the trained model may be trained further based on information about at least one of (i) the failure and (ii) the at least one executed test case that has detected the failure. The further training may be based on the input vector quantifying the modifications in the software modules of the new release and the at least one executed test case as training information.

Also provided is computer program product comprising program code portions for performing the steps of any of the method aspects when the computer program product is executed on one or more processors. The computer program product may be stored on a computer-readable recording medium, such as a hard disk or semiconductor memory.

Also provided is an apparatus configured to train a model for determining a test case for software testing, wherein the software testing is based on a set of test cases built for a set of software modules comprised by a software to be tested. The apparatus is configured to obtain log information resulting from execution of each of the test cases, wherein the log information is obtained per software module and per executed test case, and to perform supervised machine learning based on the log information obtained per software module and per executed test case as input to train a model for predicting the executed test case.

The training apparatus may be configured to perform the training method according to the first aspect.

Further provided is an apparatus configured to determine at least one test case for software testing out of a set of test cases built for a set of software modules comprised by a software to be tested. The apparatus is configured to obtain a trained model configured to predict at least one test case to be executed and to obtain a software to be tested that comprises a new release of the set of software modules, wherein in the new release of the software modules at least one of the software modules was modified compared to an earlier release of the software modules. The apparatus is further configured to determine, per software module, if the software module in the new release was modified relative to the earlier release, and to generate a data structure representable as an input vector having a dimension corresponding to a number of software modules comprised by the set of software modules, with the input vector having vector components quantifying a modification of the respective software module. Further still, the apparatus is configured to determine at least one test case for the new release of software modules based on an output of the trained model using the data structure as an input.

The apparatus using the trained model may be configured to perform the method according to the second aspect.

Also provided is an apparatus system comprising the training apparatus and the apparatus using the trained model.

BRIEF DESCRIPTION OF THE DRAWINGS

Further aspects, details and advantages of the present disclosure will become apparent from the detailed description of exemplary embodiments below and from the drawings, wherein:

FIG. 2 is representation of a log file content obtained from execution of an OpenStack software module;

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, some embodiments of the following description focus on an exemplary supervised machine learning implementation that is based on a neural network, the present disclosure is not limited in this regard. The present disclosure could also be implemented using other artificial intelligence concepts (e.g., regression techniques, linear estimators, logistic regression, statistical estimates and information theory techniques). Moreover, while the following embodiments will be described in the context of software and test cases exemplarily relating to a cloud execution environment, it will be appreciated that the test cases and the software to be tested are not restricted in any way.

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

The following embodiments relate to a technique for smart test case selection using machine learning. To this end, a set of two or more test cases $T_i$, i=2, . . . M is initially defined. The set of test cases is built for testing a set of software modules $M_j$, j=2, . . . N comprised by the software to be tested. The software to be tested may in some variants be a software stack or software suite comprising or consisting of the set of software modules. The software modules $M_j$ may be interrelated in that one particular software module is configured to communicate with one or more other software modules (e.g., to accomplish a particular overall task). The software modules $M_j$ are also referred to as services or components.

A particular test case $T_i$ may comprise software code that, upon execution, calls one or more of the software modules $M_j$ forming the set of software modules $M_j$. A particular software module Mj may be called twice or more often by a particular test case $T_i$. Assume, as a non-limiting example, that M=4 and N=5, with the following ordered set of test cases $T_1$ to $T_4$:

$T_1 = \{M_1\}$;
$T_2 = \{M_1; M_3; M_4; M_1\}$;
$T_3 = \{M_2; M_3; M_5; M_1\}$; and
$T_4 = \{M_3; M_4; M_1; M_5; M_1; M_4\}$.

The software modules $M_j$ may in one embodiment be comprised by a dedicated computing platform, such as the open standard cloud computing platform OpenStack. Those computing platforms typically have a modular configuration and consist of a large number of interrelated software modules $M_j$. As an example, OpenStack comprises dedicated software modules providing computing services (this software module is also called "Nova"), networking services ("Neutron"), image services ("Glance"), object storages services ("Swift"), and so on.

The software modules $M_j$ are regularly extended and updated in dedicated releases, so that new software modules $M_j$ are added and existing software modules $M_j$ are modified from release to release. As an example, the OpenStack community collaborates in comparatively short release cycles of approximately six months. It will thus be evident that OpenStack, as other computing platforms and software stacks, suites or packets, is an excellent candidate for automated software testing.

As such, some or all of the software modules $M_j$ of each new release will need to be tested before they can be rolled out in an operative environment. Such tests can be performed on the software developing side as well as on the side of the software user. Typically, testing is often performed based on a set of test cases $T_i$ that, when executed, call individual ones of the software modules $M_j$ of the set of software modules $M_j$, as described above. Each test case $T_i$ typically comprises a number l of test steps $T_{i,l}$ (l=1, 2, . . . ), and each test step $T_{i,l}$ comprises calling and executing one or more of the software modules $M_j$.

In the OpenStack context, an exemplary test case $T_1$ may comprises the following sequence of test steps (and include the corresponding software modules "Neutron", "Nova" and "Glance"):

a) Create a Neutron network
b) Create a Glance image
c) Create a Nova flavour d) Create a Neutron security group e) Create Neuron ports f) Create a Nova server with the above created resources It will be evident that further OpenStack test cases $T_2$, $T_3$, . . . can be defined based on the above, based on other, or based on additional software modules $M_j$. In general, each test case will comprise one, two or more test steps, and each test step will call one, two or more software modules $M_j$ that are to be executed.

During execution of a particular software module $M_j$, log information will be generated and written into a so-called log file. As an example, the log file may comprise information about individual events taking place upon execution of a particular software module $M_j$ to provide an audit trail that can be used to understand the activity of the software module and to diagnose problems. The logged events can also take the form of one or both of transactions (e.g., of a database module) and messages (e.g., of a communication module).

Figure 1:
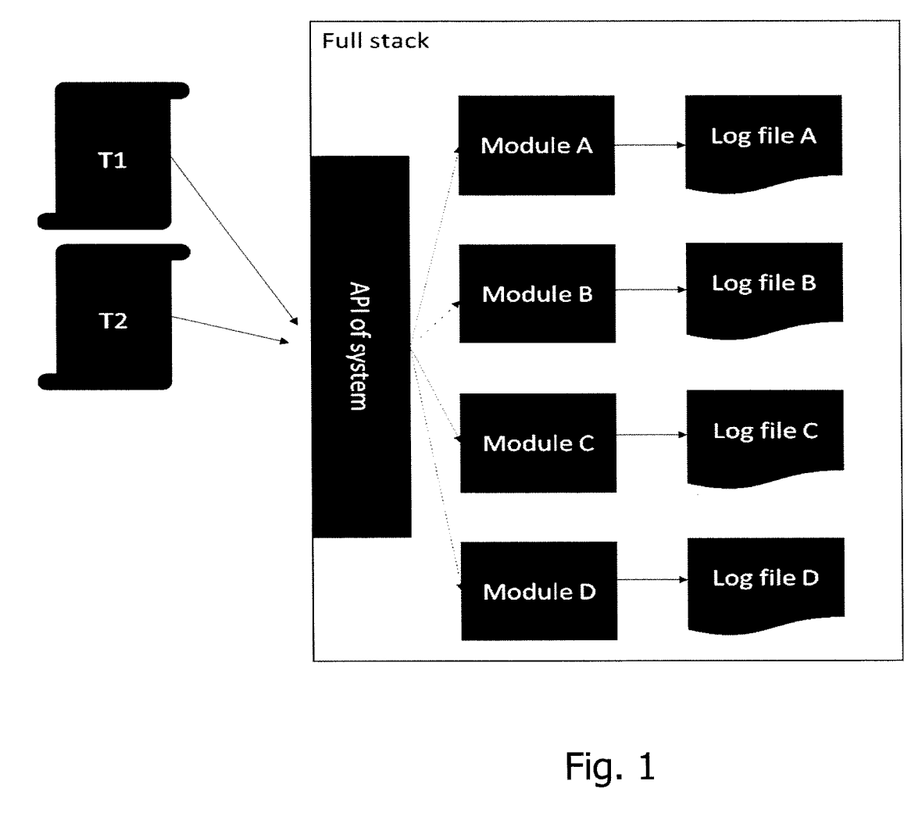
FIG. 1 is a schematic representation of an association between test cases and software modules.

FIG. 1 illustrates an embodiment of an exemplary testing system 100 comprising two test cases $T_1$ and $T_2$ each configured to call, upon execution, one or more of four software modules $M_A$, $M_B$, $M_C$ and $M_D$ of a certain software stack. As shown in FIG. 1, the test cases $T_1$ and $T_2$ call the software modules $M_A$, $M_B$, $M_C$ and $M_D$ via an API of the software stack.

Each of the four software modules $M_A$, $M_B$, $M_C$ and $M_D$, in turn, is configured to write in a dedicated log file A to D when being executed. In case a particular software module $M_j$ is executed twice or more often for a particular test case $T_i$, the log information generated in these executions may be written in the same log file.

In the above OpenStack-related test case, Neutron log information will be created in steps a), d) and e), Glance log information will be created in step b), and Nova log information will be created in steps c) and f). FIG. 2 illustrates the raw (i.e., unprocessed) log information contained in an exemplary Neutron log file.

A particular software module may comprise one, two or more individual sub-modules $M_{j,k}$ (k=1, 2, . . . ), and log information may be created separately for each sub-module $M_{j,k}$. For example, in step f) of the OpenStack test case $T_1$ described above, separate log information may thus be created for different Nova sub-modules such as Nova scheduler, Nova api, Nova computes, etc. Such sub-modules will not be considered in more detail hereinafter, but it will be evident that the embodiments can readily be extended to have a more granular nature that is based on log information generated from software sub-modules.

Once a particular test case $T_i$ (such as the OpenStack test case $T_1$ described above) has been executed in a dedicated test environment for a given software module release, log information will have been recorded for the different software modules $M_j$ called by (i.e., associated with) that test case $T_i$. Of course, the particular test case $T_i$ will have been executed already for earlier releases, so that historic log information will have been stored and can be used in the context of the present disclosure to facilitate test case selection for efficient and high-quality software testing. In particular, at least some of the test cases $T_i$ will have been executed before and after a particular software module $M_j$ associated therewith has been modified from one release to the next release of a software module set. So if there is a change in the log information gathered for that particular software module $M_j$ from one release to the next release (e.g., because the number of lines of or the number of events in the associated log file have changed), there is a probability that the software module $M_j$ was modified for the next software release. Due to the change in the log information, one can also deduce that the modification of the software module $M_j$ is somehow impacting the particular test case $T_i$ comprising that software module $M_j$.

The present disclosure builds upon the above insights to suggest a supervised machine learning approach that is based on historic and, optionally, current log information obtained by executing a set of test cases $T_i$ once or multiple times in a test environment for the same or for different releases of a set of software modules $M_j$ comprised by the test cases $T_i$. Evidently, this log information may be indicative of if (and possibly how) the set of test cases $T_i$ is impacted by modifications of the software modules $M_j$ and, therefore, permits a prediction of how the test cases $T_i$ correlate with modifications in the software modules $M_j$. This correlation, once derived by supervised machine learning, may then be exploited in a next step for selecting one or more particularly promising test cases $T_i$ out of a larger set of test cases $T_i$ in view of the particular software module modifications detected in a new software module release.

The log information for training the model may have been obtained in a test environment by executing the test cases $T_i$. Later on, after the training phase, information about actual failures detected by the test cases $T_i$ may be used used to further train the model and, thus, to enhance its prediction capabilities in regard to the test cases $T_i$ to be executed for the new or any further release. That is, the further training will no longer be based on log information.

The following embodiments suggest training a model that, when trained, can be used to predict, based on detected software module modifications, which selected test case(s) $T_i$ out of the set of test cases $T_i$ to execute for efficiently testing the new software modules $M_j$. The technique is based on the assumption that a software module $M_j$ that produces a large amount of log information (e.g., many log lines or logged events) while a test case $T_i$ is executed is specifically tied to the test case $T_i$ and, therefore, that execution of the test case $T_i$ is likely to detect a failure when the software module $M_j$ has been modified.

Figure 3:
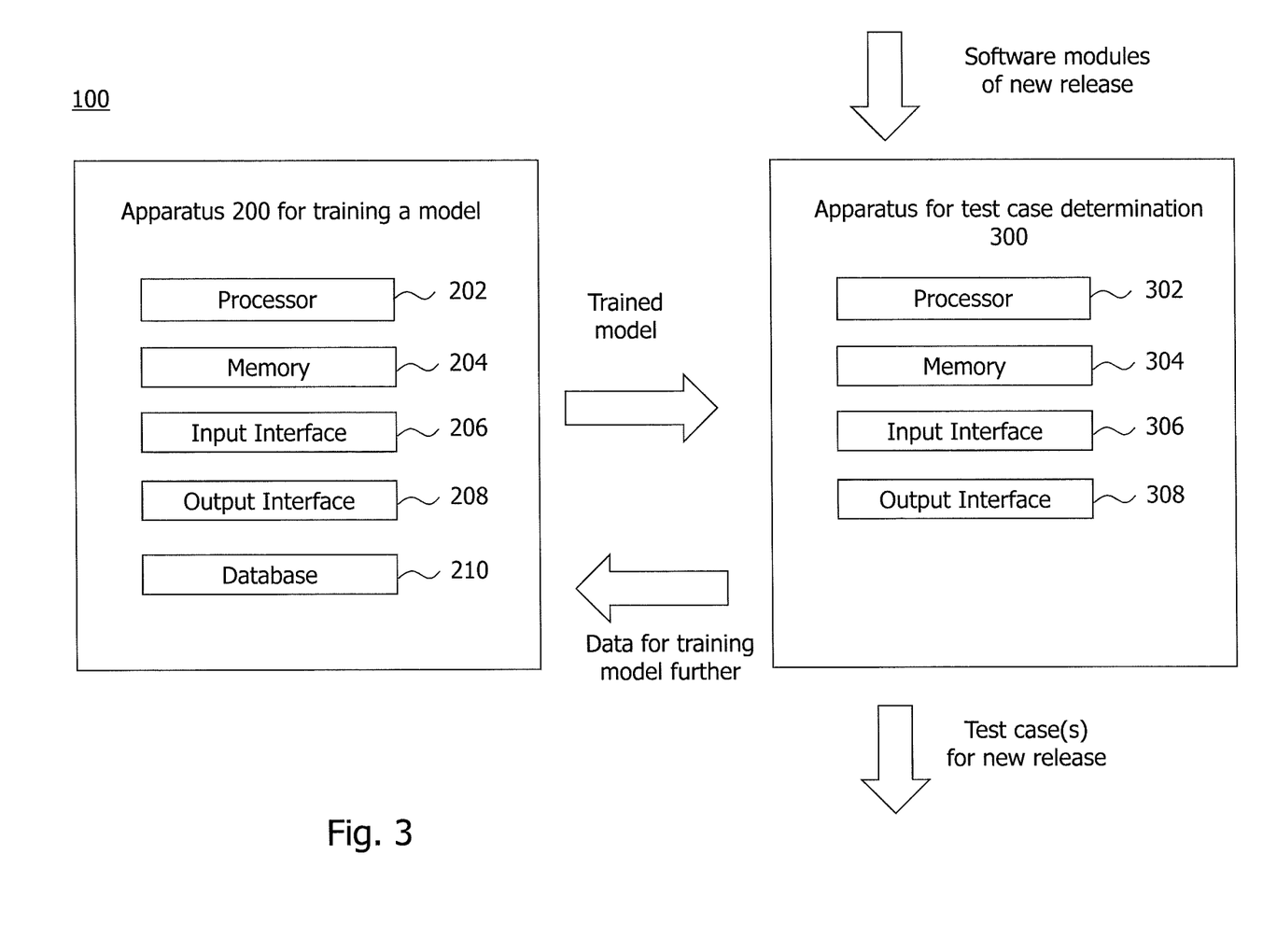
FIG. 3 is a diagram of a system embodiment of the present disclosure with two separate apparatus embodiments.

FIG. 3 illustrates an apparatus system 100 for automated software testing. The apparatus system 100 comprises an apparatus 200 configured to train a model (e.g., a neural network) for predicting an executed test case $T_i$ as well as an apparatus 300 configured to determine at least one test case $T_i$ our of a set of test cases $T_i$ for testing a new release of the software modules $M_j$. The apparatus 200 may be operated independently from the apparatus 300. As such, the apparatus 200 may not be co-located with the apparatus 300. In other variants, the two apparatuses 200, 300 may be co-located or even be configured as a single apparatus (e.g., using the same hardware resources). One or both of the apparatuses 200, 300 may be built from cloud computing resources.

The apparatus 200 for training the model comprises a processor 202 as well as a memory 204 coupled to the processor 202. The memory 204 stores program code that controls operation of the processor 202 so as carry out the operations involved in data structure generation. The apparatus 200 further comprises an input interface 206 and an output interface 208 as well as a database 210 in which historic log information is stored.

The apparatus 300 for determining at least one test case $T_i$ out of a set of test cases $T_i$ for testing a new release of the software modules $M_j$ comprises a processor 302 and a memory 304 coupled to the processor 302. The memory 304 stores program code that controls operation of the processor

302 so as carry out the operations involved in test case selection. The apparatus 300 further comprises an input interface 306 and an output interface 308.

Figure 4:
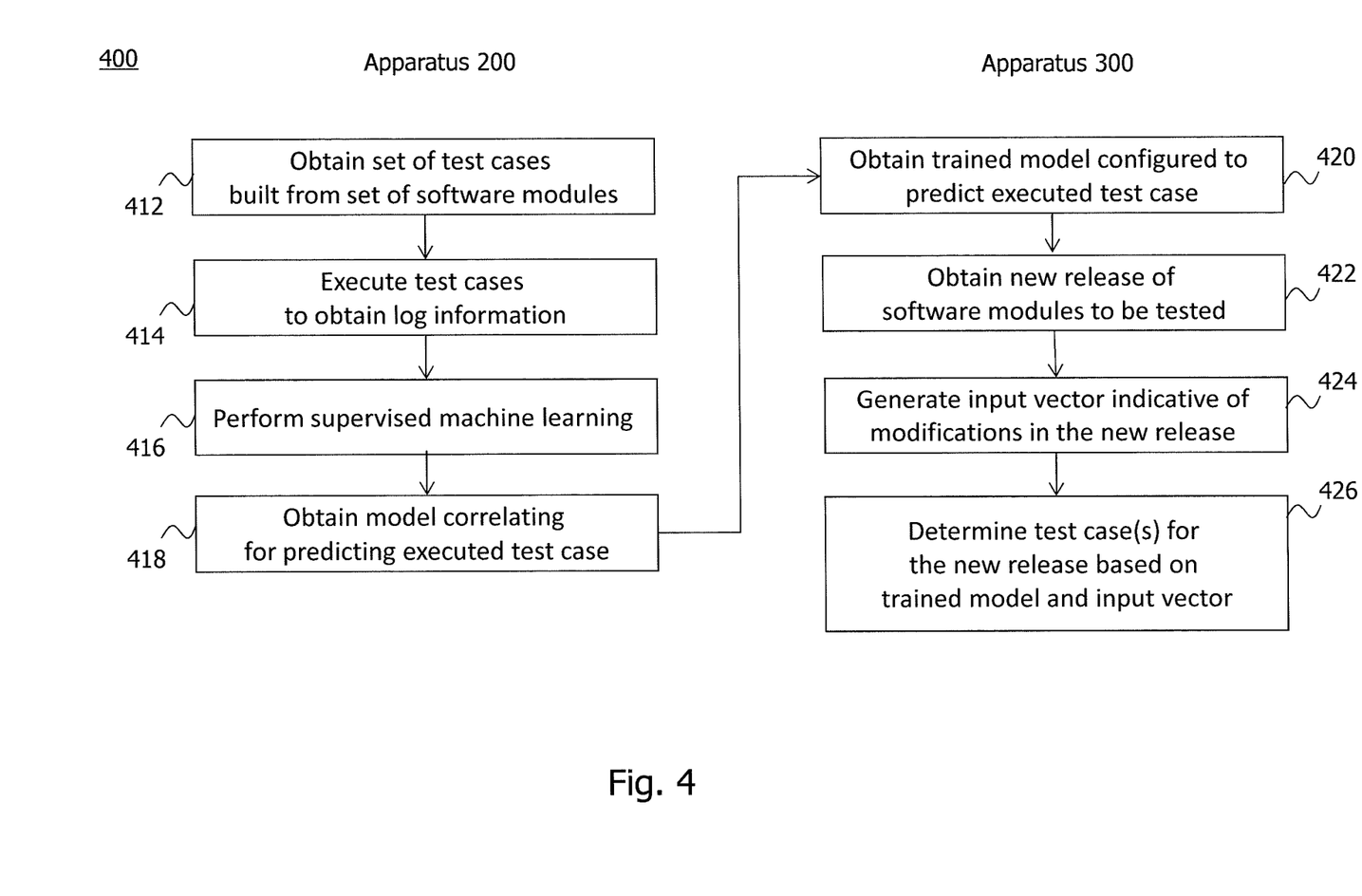
FIG. 4 is a diagram illustrating method embodiments of the present disclosure as performed by the apparatus embodiments of FIG. 2.

Operation of the apparatuses 200, 300 as depicted in FIG. 3 will now be described with reference to a method embodiment illustrated in the flow diagram 400 of FIG. 4.

Operation of the apparatus 200 for model training comprises obtaining log information that can be utilized for supervised machine learning. This log information may be obtained (e.g., retrieved) by the processor 202 from the database 210 and may have been generated earlier (e.g., by the processor 202 or by any other device) based on a predefined set of test cases $T_i$ for a predefined set of software modules $M_j$ (see step 412 in FIG. 3). In more detail, as illustrated by step 414, the obtained log information may result from execution of each of the test cases $T_i$. As such, the log information is obtained per software module $M_j$ and per executed test case $T_i$. Some of the test cases $T_i$ may have been executed one time before a modification of at least one software module $M_j$ comprised therein and another time after the modification, and there may be a log information change between the two executions. For example, the test cases $T_i$ may have been executed for different releases of the set of software modules $M_j$ so as to generate a large amount of log information for use as training data, that stretches across these different releases. In other variants, the test cases $T_i$ may have been executed for only a single release (e.g., when a large number of test cases $T_i$ has been defined so that a large amount of log information can be obtained therefrom).

Operation of the apparatus 200 further comprises performing supervised machine learning based on the log information obtained per software module $M_j$ and per test case $T_i$ as input (see step 416). This input is indicative of the log information change per different executions of each software module $M_j$. Supervised machine learning is used to train a model configured to predict the executed test case per input (see step 418).

The model may take the form of a neural network that is trained on the basis of training vectors to yield an output vector per training vector. In the training phase, the model is trained such that the output vector is indicative of the executed test case (and of the test case(s) to be executed once the training has been completed and "real" data is input to the trained model).

Figure 5:
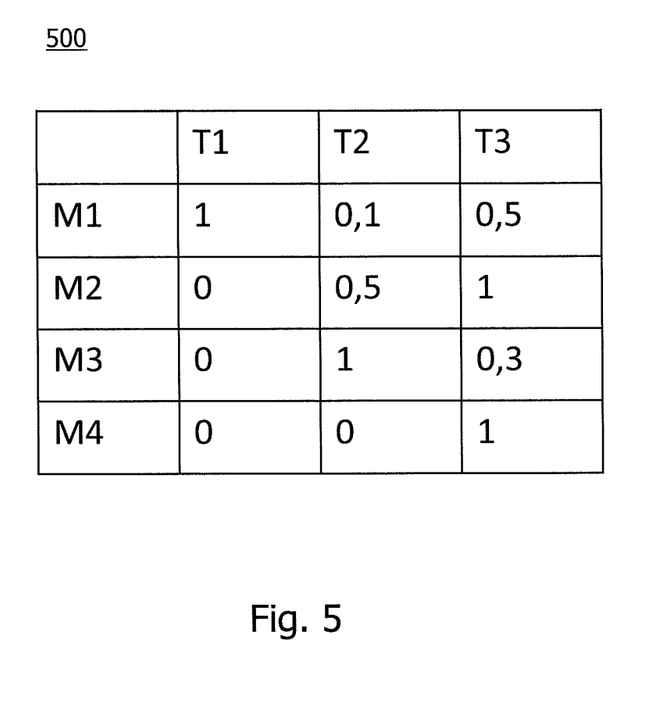
FIG. 5 is diagram illustrating in matrix form a set of training vectors.

An example of a set of training vectors arranged in the form of a matrix 500 as input for supervised machine learning is illustrated in FIG. 5. The matrix 500 has a first dimension indicative of a set of three test cases $T_i$ and a second dimension indicative of a set of four software modules $M_j$ from which the test cases $T_i$ are built. Here, it is assumed that $T_1 = \{M_1\}$;
$T_2 = \{M_1; M_2; M_3\}$; and
$T_3 = \{M_1; M_2; M_3; M_2; M_4\}$.

The resulting training vectors $V_T$ can thus be denoted (1; 0; 0; 0) for $T_1$, (0,1; 0,5; 1; 0) for $T_2$ and (0,5; 1; 0,3; 1) for $T_3$.

Each training vector $V_T$ consists of four vector components, one for each of the software modules $M_j$. The vector components for a given software module $M_j$ in different training vectors $V_T$ are weighted relative to each other across the executed test cases $T_i$. In the present variant, the weighting is performed such that the vector components for a given software module $M_j$ in different training vectors $V_T$ reflects a amount of log information created by the given software module $M_j$ in different training vectors $V_T$ upon execution of a particular test case $T_i$ relative to an amount of log information created by the given software module $M_j$ in different training vectors $V_T$ upon execution of another test case $T_i$. The weighting (i.e., the vector components) may be normalized relative to the test case $T_i$ that yielded the largest amount of log information.

In the example depicted in FIG. 5, it can be seen for software module $M_1$ that execution of test case $T_1$ yielded the largest amount of log information, say 100 logged events (e.g., counted in terms of log lines in the associated log file), whereas execution of test case $T_2$ yielded the smallest amount of log information, say 10 logged events, and execution of test case $T_3$ yielded a medium amount of log information, say 50 logged events. For normalization purposes, the highest amount of log information may be identified and the remaining amounts of log information may be divided by that amount, yielding a weight of 1, 0,1 and 0,5, respectively, for software module $M_1$ in the three test cases T1 to T3 depicted in FIG. 5.

The matrix 500 will often be comparatively sparse because a particular test case $T_i$ typically is built from only few software modules $M_j$ out of the full software module set. This means that many basic test cases $T_i$ will not have any correlation with most of the software modules $M_j$. As is illustrated in FIG. 5, the vector component (i.e., weight) is used in case a particular test case $T_i$ does not call particular software module $M_j$.

Figure 6:
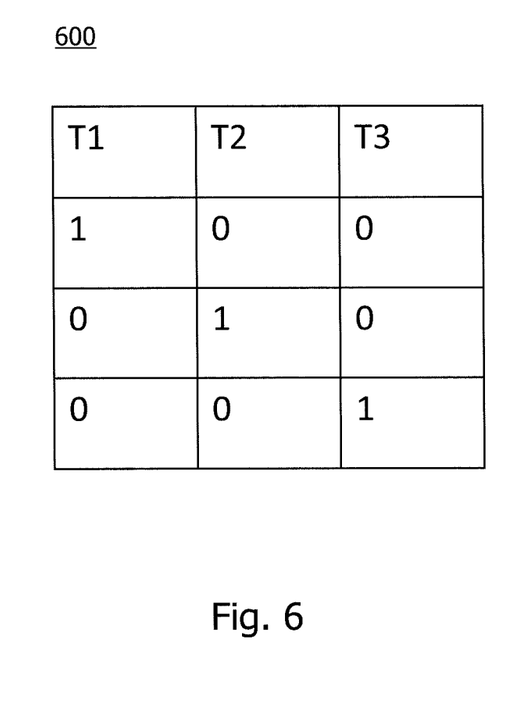
FIG. 6 is diagram illustrating in matrix form a set of output vectors.

The model is trained in a supervised manner such that it yields one output vector $V_O$ per training vector $V_T$. FIG. 5 illustrates an example of a set of three output vectors $V_O$ for the three training vectors $V_T$ of FIG. 6. In FIG. 6, the three output vectors $V_O$ are arranged in the form of a matrix 600 representing three one hot vectors denoted (1; 0; 0) for $T_1$, (0; 1; 0) for $T_2$ and (0; 0; 1) for $T_3$. The dimension of each output vector $V_O$ thus corresponds to the number of test cases $T_i$ (here: 3).

Figure 7:
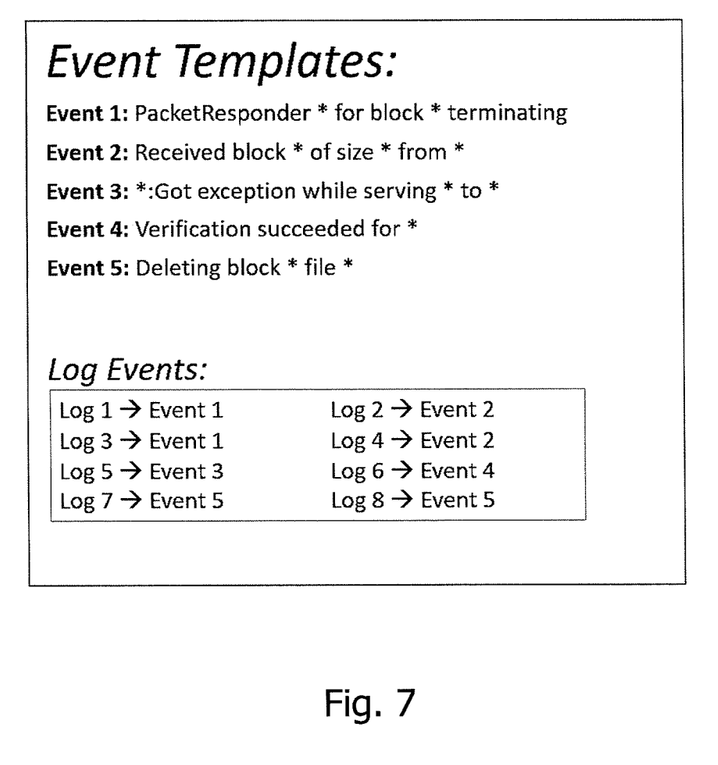
FIG. 7 is diagram illustrating an event template to be applied to log files for feature extraction.

To enhance supervised machine learning the raw log information (see FIG. 2) may in some embodiments be processed before deriving the vector components illustrated in FIG. 5. Processing of the raw log information targets, inter alia, at concentrating the input for the supervised machine learning on logged events that are potentially indicative of software module modifications. To this end, the individual logged events contained in log information created by a particular software module during a particular test case execution may optionally be parsed and split into a constant event part and a variable event part based on event templates as illustrated in FIG. 7. These event templates are used to identify and process particular events, so that individual logged events can selectively be pruned in case they are held to not be indicative of potential "anomalies".

So in FIG. 7, a first logged event (e.g., a first log line) is identified to be an event of predefined event type 1, a second logged event (e.g., a second log line) is identified to be an event of predefined event type 2, and so on. One or more, or all, of the predefined event types may be indicative of logged events to be pruned prior to generation of the actual training data for the model that is to be trained. As an example, regular "health checks" logged in the log files can be pruned. In this manner, the log information can be concentrated on logged events that are potentially indicative of software module modifications.

To extract potentially important log information, an optional normalization process is applied. Normalization may occur before or after event parsing. The normalization process involves one or more of the following normalization steps:

a) Conversion of all letters in the log information to small cap letters;
b) Deletion of symbols (e.g., -, +, ?, (,), [, etc.) and weak expressions (e.g., a, the, of, from, etc.) without meaning in the context of machine learning;
c) Elimination of unique values such as identifiers (e.g., in OpenStack each virtual instance has its ID for management, so log files pertaining to the same event may have different instance IDs that need to be removed).

Before or after such an (optional) normalization process, the log information may be pruned as explained above such that logged events occurring repeatedly upon execution of a particular software module $M_j$ across the test cases Tare deleted from the log information that is actually used for training the model. This pruning is based on the insight that the pruned log information is not particularly capable of indicating possible abnormalities of software model execution. The "remaining" log information will then be used for the weighting process discussed above in the context of FIG. 5.

Once the model (e.g., in the form of a neural network) has been trained as explained above, it can be used by the apparatus 300 of FIG. 2 for determining one or more test cases for a new software module release, as will now be described in greater detail with reference to steps 420 to 426 in FIG. 3.

Figure 8:
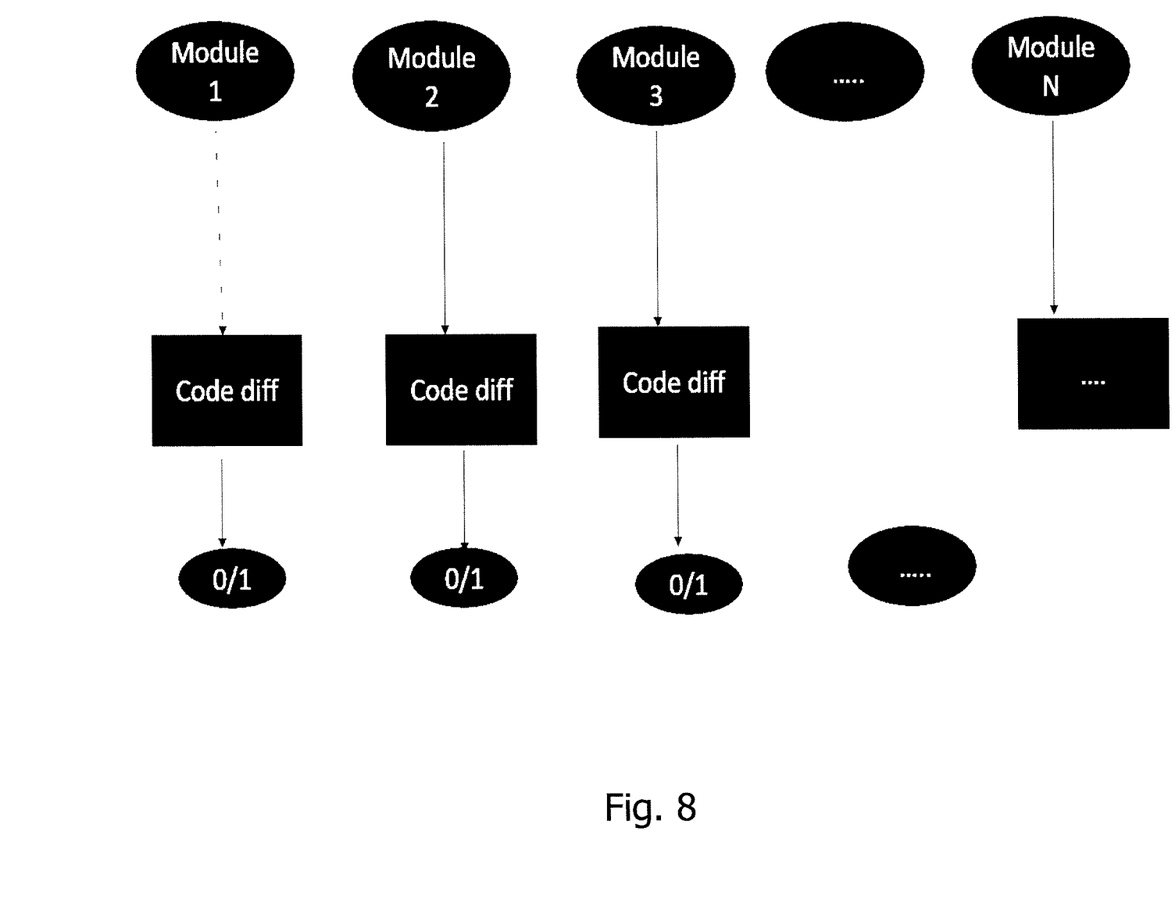
FIG. 8 is diagram illustrating determination of code modifications in software modules of a new release.
Figure 9:
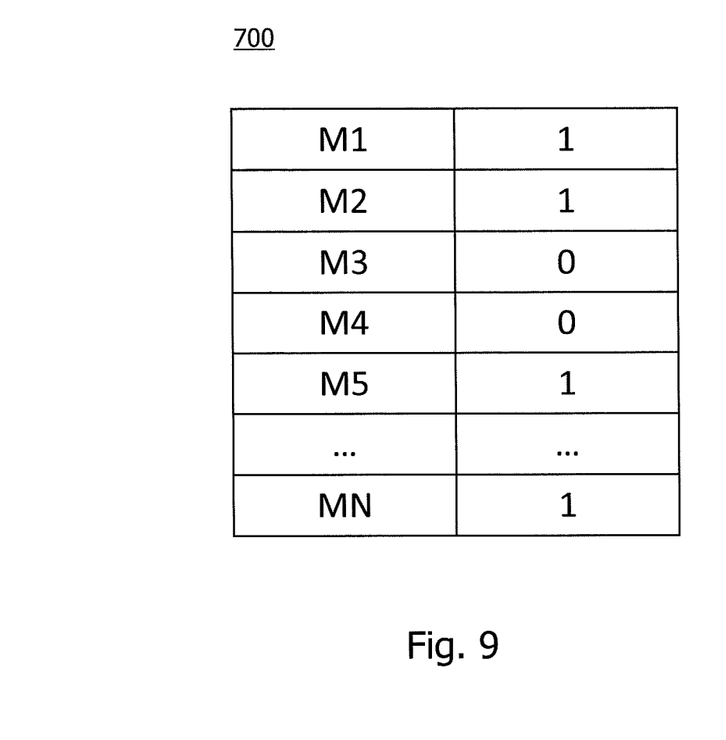
FIG. 9 illustrates the determined software module code changes in matrix form.

Initially, the apparatus 300 receives the trained model in step 420. Moreover, in step 422, the apparatus 300 obtains a new release of the software modules $M_j$ that is to be tested. In step 424, the apparatus 300 first determines, per software module $M_j$, if there is a modification relative to the earlier release. To this end, it is determined if there is any code difference between the two releases of a particular software module $M_j$ (see FIG. 8). For example, the numbers of code lines or the software module sizes may be compared in this context. The result of this determination is a matrix 700, as illustrated in FIG. 9.

The matrix 700 indicates for each of the software modules $M_j$ of the new release if a software module modification has occurred. In one implementation, the matrix components may simply be binary values indicative of whether there has been any code change ("1") or not ("0"), see FIG. 9. In other implementations, the code change may be quantified in a more sophisticated manner. It will be appreciated that the matrix 700 of FIG. 9 has the same format as the training vectors $V_T$ discussed above with a single dimension defined by the number of software modules $M_j$. As such, the content of the matrix 700 can be used as input for the trained model.

It is assumed here that the number of software modules has not changed between the previous and the new release, so that an input vector $V_I$ for the trained model derived from the matrix 700 and the training vectors $V_T$ have the same dimension. In case a new software module has been added in the new release, the model needs to be trained anew.

Figure 10:
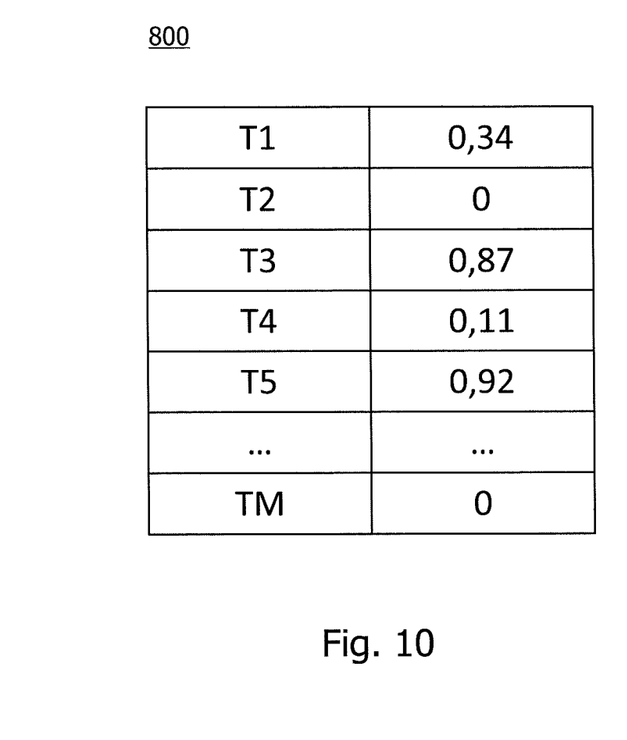
FIG. 10 illustrates in matrix form a prediction result as output by a trained model.

In a further step 426, one or more test cases for testing the new software module release are determined based on the trained model and the input vector $V_I$ as determined in step 424. The result of the correlation in step 426, i.e., has the dimension of the one hot vectors illustrated in FIG. 6 and provides for each test case $T_i$ a numerical value, or weight, indicative of the test case's potential to yield a meaningful response to the specific software module modifications in the new release (i.e., to detect a failure upon test case execution). In some variants, each numerical value ranges between 0 and 1, see the matrix 800 of FIG. 10. The closer the numerical value is to 1, the more suitable the associated test case $T_i$ is for software testing.

As an example, the particular test case $T_i$ yielding the highest weight or all test cases $T_i$ having associated weights above a certain threshold may be selected for software testing. This means in the scenario of FIG. 10 that only test case $T_5$ or test cases $T_3$ and $T_5$ may be selected. In some variants, each test cases $T_i$ such selected may be delivered together with the new software module release as part of the actual product.

In some embodiments, the trained model may be trained further based on the execution results of the selected test cases $T_i$. If, for example, it is identified that some of the selected test cases $T_i$ upon execution have detected failures (e.g., because the test case failed as a whole or in certain aspects), a new vector for training purposes can be created that has the dimension of the output vector $V_O$, wherein the vector components are set to 1 for the one or more test cases $T_i$ that have failed and to 0 for the one or more test cases $T_i$ that have passed (or that have not been executed). Together with the input vector $V_I$ from the code difference analysis (see FIGS. 8 and 9) a new training data set of the model to be trained further is obtained. As such, the model may learn from real test case execution, as the previous test case executions may have occurred in a pure testing environment.

If it turns out later that a failure in the new release has been overlooked but detected by a test case T that was initially not selected in step 426 but, e.g., selected by a human tester based on his/her experience, one may return to the newly obtained training data set and change the value of that test case T to 1 before training the model further using the resulting data set.

As such, the further training of the trained model will not, or not only, be based on log information, but on actual failures in individual software modules as detected by individual test cases (output vector for further training) and on actually detected software modifications (input vector for further training). In this manner, the prediction accuracy of the model that has been pre-trained based on log information can significantly be improved.

As has become apparent from the above description of exemplary embodiments, the AI-assisted test case selection approach presented herein permits a reduction of human interaction with test case selection while at the same time allowing for a better test coverage. The AI-assisted selection of one or only a few test cases out of a larger test case set also reduces the amount of test data that needs to be evaluated. In sum, software testers require less time and less efforts for testing a new software release.

While the invention has been described with reference to exemplary embodiments, it will be appreciated that those embodiments are not intended to limit the scope of the claims appended hereto.

The invention claimed is:

1. A method of training a model for determining a test case (Ti) for software testing, wherein the software testing is based on a set of test cases built for a set of software modules (Mj) comprised by a software to be tested, the method comprising:
obtaining log information resulting from execution of each of the test cases, the log information being obtained per software module and per executed test case, the log information comprising one or more logged events;
performing supervised machine learning based on the log information obtained per software module and per executed test case as input to train a model for predicting the executed test case, the input to the model being representable as a set of training vectors, each training vector being associated with a particular executed test case and having a dimension corresponding to a number of software modules comprised by the set of software modules, each training vector having vector components derived from the log information; and processing the log information prior to deriving the vector components, processing the log information obtained for a particular software module comprising pruning a portion of the log information pertaining to one or more logged events repeatedly occurring upon execution of the particular software module across the test cases.

2. The method of claim 1, wherein
an output of the model is representable as a one hot vector indicative of the executed test case.

3. The method of claim 1, wherein
the vector components for a given software module in different training vectors are weighted relative to each other across the executed test cases to reflect an amount of log information created by the given software module upon execution of a particular test case relative to an amount of log information created by the given software module upon execution of another test case.

4. The method of claim 1, wherein
the log information is contained as logged events in a log file created per test case execution and per software module.

5. The method of claim 3, wherein
the amount of log information is derived from a number of logged events contained in a particular log file.

6. The method of claim 1, wherein
the amount of log information is defined by the number of logged events contained in a particular log file after logged events repeatedly occurring upon execution of the particular software model across the test cases have been pruned.

7. The method of claim 1, wherein
deriving a vector component for a given executed test case and a given software module comprises normalizing an amount of log information created for the given test case and the given software module relative to a maximum amount of log information created for the given software module upon execution of any of the test cases.

8. The method of claim 1, wherein
the model comprises a neural network.

9. The method of claim 1, comprising
using the trained model for determining at least one test case for software testing.

10. The method of claim 9, wherein
the software to be tested comprises a new release of the set of software modules in which at least one of the software modules was modified compared to an earlier release of the software modules.

11. The method of claim 10, comprising
determining, per software module, if the software module in the new release was modified relative to the earlier release.

12. The method of claim 11, comprising
generating an input vector having a dimension corresponding to a number of software modules comprised by the set of software modules, with the input vector having vector components quantifying a modification of the respective software module.

13. The method of claim 12, wherein
the vector components are one of integers, floating point numbers and binary values.

14. The method of claim 12, wherein
determining the at least one test case for the new release of software modules comprises inputting the input vector to the trained model.

15. A method of determining at least one test case (Ti) for software testing out of a set of test cases built for a set of new software modules (Mi) comprised by a software to be tested, the method comprising:
obtaining a trained model configured to predict the at least one test case;
obtaining the software to be tested, in the new release of the software modules at least one of the software modules having been modified compared to an earlier release of the software modules;
determining, per software module, if the software module in the new release was modified relative to the earlier release;
generating a data structure representable as an input vector having a dimension corresponding to a number of software modules comprised by the set of software modules, with the input vector having vector components quantifying a modification of the respective software module; and
determining the at least one test case for the new release of software modules based on an output of the trained model using the data structure as an input.

16. An apparatus configured to train a model for determining a test case (Ti) for software testing, wherein the software testing is based on a set of test cases built for a set of software modules (Mj) comprised by a software to be tested, the apparatus comprising a processor configured to:
obtain log information resulting from execution of each of the test cases, the log information being obtained per software module and per executed test case, the log information comprising one or more logged events;
perform supervised machine learning based on the log information obtained per software module and per executed test case as input to train a model for predicting the executed test case, the input to the model being representable as a set of training vectors, each training vector being associated with a particular executed test case and having a dimension corresponding to a number of software modules comprised by the set of software modules, each training vector having vector components derived from the log information; and
process the log information prior to deriving the vector components, processing the log information obtained for a particular software module comprising pruning a portion of the log information pertaining to one or more logged events repeatedly occurring upon execution of the particular software module across the test cases.

17. An apparatus configured to determine at least one test case (Ti) for software testing out of a set of test cases built for a set of new software modules (Mi) comprised by a software to be tested, the apparatus comprising a processor configured to:
obtain a trained model configured to predict the at least one test case;
obtain the software to be tested, in the new release of the software modules at least one of the software modules having been modified compared to an earlier release of the software modules;
determine, per software module, if the software module in the new release was modified relative to the earlier release;
generate a data structure representable as an input vector having a dimension corresponding to a number of software modules comprised by the set of software modules, with the input vector having vector components quantifying a modification of the respective software module; and determine the at least one test case for the new release of software modules based on an output of the trained model using the data structure as an input.

\* \* \* \* \*